(12) United States Patent
Anderson

(10) Patent No.: US 10,737,844 B2
(45) Date of Patent: Aug. 11, 2020

(54) SEALING DEVICE

(71) Applicant: Versapak International Limited, Erith, Kent (GB)

(72) Inventor: Ian Denny Anderson, Chelsfield (GB)

(73) Assignee: Versapak International Limited, Erith (GB)

( * ) Notice: Subject to any disclaimer, the term of this patent is extended or adjusted under 35 U.S.C. 154(b) by 293 days.

(21) Appl. No.: 15/248,625

(22) Filed: Aug. 26, 2016

(65) Prior Publication Data

US 2017/0057703 A1 Mar. 2, 2017

(30) Foreign Application Priority Data

Sep. 1, 2015 (GB) .................................. 1515484.2

(51) Int. Cl.
*B65D 33/25* (2006.01)
*G09F 3/03* (2006.01)
*B65D 27/28* (2006.01)

(52) U.S. Cl.
CPC ......... *B65D 33/2591* (2013.01); *B65D 27/28* (2013.01); *B65D 33/25* (2013.01);
(Continued)

(58) Field of Classification Search
CPC ............... Y10T 292/48; Y10T 292/498; Y10T 292/507; Y10T 292/496; Y10T 292/495; Y10T 24/1498; Y10T 292/505; Y10T 24/2511; Y10T 70/5053; Y10T 292/499; Y10T 24/50; Y10T 292/492; Y10T 292/516; Y10T 24/153; Y10T 24/2586; Y10T 24/141; Y10T 292/528;
(Continued)

(56) References Cited

U.S. PATENT DOCUMENTS 3,070,986 A * 1/1963 Hart ...................... A44B 19/301
70/68
3,138,842 A * 6/1964 Arthur ................. A44B 19/301
24/615
(Continued)

FOREIGN PATENT DOCUMENTS

EP 0109793 A2 5/1984
GB 1424680 A 11/1976
(Continued)

OTHER PUBLICATIONS

Search Report for corresponding patent application GB1515484.2 (now granted as GB2541891) dated Feb. 25, 2016.
(Continued)

*Primary Examiner* — Mark A Williams
(74) *Attorney, Agent, or Firm* — Crawford Maunu PLLC

(57) ABSTRACT

A sealing apparatus for tamper-evidently closing an opening in a sealable product comprising a locking housing mountable adjacent the opening and including an entrance passage leading to a stall; a fastener for closing the opening, the fastener having a fastener head adapted to pass through the entrance passage into the stall and an actuator tab attached to and movable about the fastener head to, with the fastener head received into the stall, engage with and close the entrance passage behind the fastener head, and a seal for tamper-evidently securing the actuator tab in position in the entrance passage.

16 Claims, 9 Drawing Sheets

(52) U.S. Cl.
CPC .......... *G09F 3/0311* (2013.01); *G09F 3/0323* (2013.01); *B65D 2101/00* (2013.01)

(58) Field of Classification Search
CPC ............ Y10T 70/5004; B65D 33/2591; B65D 27/30; B65D 77/185; B65D 33/34; B65D 63/1027; B65D 63/1063; B65D 2101/00
See application file for complete search history.

(56) References Cited

U.S. PATENT DOCUMENTS

| | | | |
|---|---|---|---|
| 4,062,090 A | 12/1977 | Moolenaars | |
| 4,512,599 A * | 4/1985 | De Lima Castro Netto | A44B 19/301 24/388 |
| 4,514,884 A * | 5/1985 | Kaneko | A44B 19/301 190/120 |
| 4,602,405 A * | 7/1986 | Sturman | A44B 19/301 24/385 |
| 4,995,656 A * | 2/1991 | Akashi | A44B 19/301 292/307 R |
| 5,065,602 A * | 11/1991 | Williams | A44B 19/301 190/903 |
| 5,253,395 A * | 10/1993 | Yano | A44B 19/265 24/387 |
| 7,021,826 B2 * | 4/2006 | Benjamins | G09F 1/04 292/307 R |
| 9,545,158 B2 * | 1/2017 | Goldberg | A47C 31/007 |
| 2002/0070566 A1 * | 6/2002 | Hudson | A44B 19/301 292/315 |
| 2004/0020017 A1 * | 2/2004 | Nedbal | A44B 19/262 24/429 |
| 2005/0161958 A1 * | 7/2005 | Graves | A44B 19/301 292/322 |
| 2007/0067969 A1 * | 3/2007 | Kusayama | A44B 19/32 24/436 |
| 2010/0142857 A1 * | 6/2010 | Bortz | B65D 33/2591 383/5 |
| 2011/0126383 A1 * | 6/2011 | Takazawa | A44B 19/26 24/389 |
| 2012/0084918 A1 * | 4/2012 | Rattner | A47C 31/105 5/500 |
| 2012/0102646 A1 * | 5/2012 | Chen | A44B 19/22 5/499 |
| 2012/0311785 A1 * | 12/2012 | Goldberg | A47C 31/007 5/498 |
| 2013/0117935 A1 * | 5/2013 | Rensink | A47C 31/007 5/499 |

FOREIGN PATENT DOCUMENTS

| | | |
|---|---|---|
| GB | 2079362 A | 1/1982 |
| GB | 2355233 A | 4/2001 |
| GB | 2366250 A | 3/2002 |
| GB | 2420743 A | 7/2006 |
| GB | 2463472 A | 3/2010 |
| WO | 2001/058303 A1 | 8/2001 |
| WO | 2002/03650 A1 | 2/2002 |
| WO | 2008025052 A1 | 3/2008 |

OTHER PUBLICATIONS

Further Search Report for corresponding patent application GB1515484.2 (now granted as GB2541891) dated Jan. 8, 2018.

* cited by examiner

Figure 4:
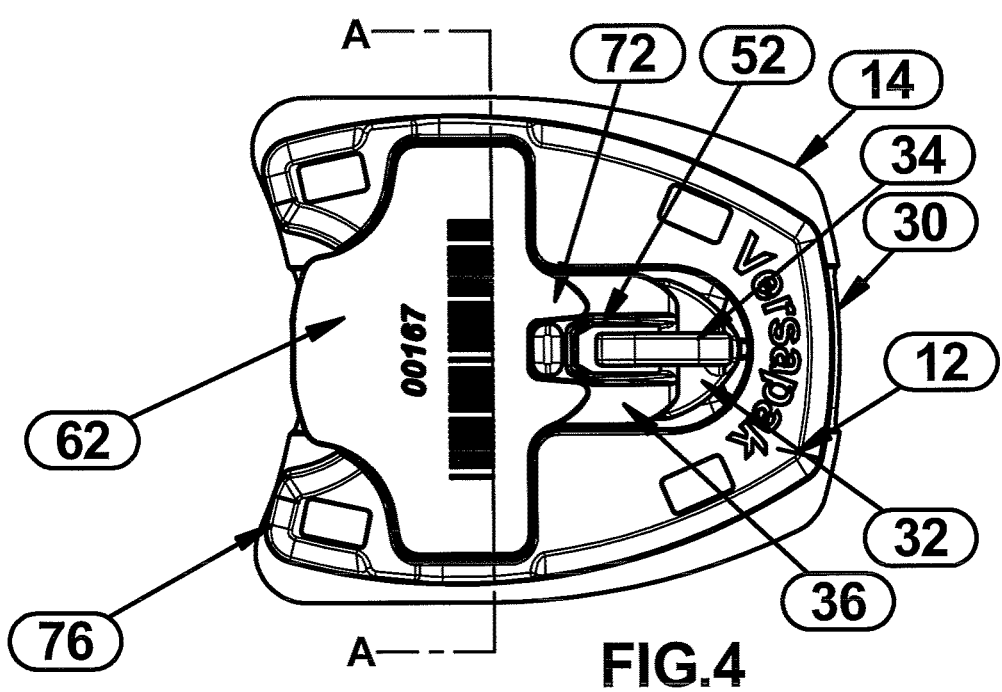

Views on section A-A fig 4

SEALING DEVICE

The present invention relates to an improved sealing device. The sealing device is particularly adapted for use in sealing reusable mailing pouches, although it may be used in other applications.

Re-usable security envelopes for securely transferring mail are well known. Typically they comprise a sealable bag, a fastening means and a security device. The bag is made from durable material such as a plastics or canvas material and the fastening means typically comprises a fastener which is movable between an open position, which allows access to the interior of the bag, and a closed position in which the bag is sealed to prevent access to the bag's interior and any contents therein. The security device typically comprises a fixed locking housing and a seal means of locking the fastening means thereto. In use, articles to be securely mailed are placed in the bag and the fastener moved to the closed position. Attached to the bag adjacent to the closed position of the fastener is the fixed locking housing to which the fastener may be detachably engaged by means of a tab attached to the fastener.

To discourage tampering whilst the bag is in transit, it is known to provide a security seal that locks the tab and therefore the fastener to the locking housing. The seal is designed for single use and breaks when the bag is opened. In order to access the contents of the bag, the seal must be broken, thereby releasing the tab from the locking housing and permitting the fastener to be moved to an open position. Any damage to the seal, tab, locking housing or fastener provides an indication of tampering during transit. The seal must be sufficiently durable to withstand rough handling during the period of transit but will generally include a point of weakness so that excessive force is not required to break it.

One prior art sealing device is disclosed in GB2420743, which shows in particular in FIG. 1(d) of that published document, a locking housing engaged with a fastener by means of a seal, such that the fastener can be moved from the shown closed position to an open position where access to the contents of the bag is possible, by breaking the seal at a point of weakness.

A further prior art sealing device is disclosed in GB1424680, which shows in particular in particular in FIG. 4 of that published document, a fastener, in this case a zip, in a closed orientation, with a tab attached to the zip head and engaged with a locking housing. A seal is engageable with the locking housing such that the zip is secured in the closed orientation by the seal, so that to open the zip the seal must be broken at a point of weakness. Thus it would be clear, on receipt of an article sealed by such an arrangement, whether any tampering had occurred, and if the contents had been accessed in transit.

Known security devices suffer from a number of disadvantages. For instance, access to the inside of the locking housing can sometimes be gained through gaps between components of the sealing device making it susceptible to picking. This problem is also often compounded by inadequacies of the seal or locking housing themselves. The means for attaching the tab to the fastener is often not adequately protected from manipulation. A further problem with known devices is that portions of the broken seal can become stuck in the locking housing thereby causing difficulty when the sealing device is next used.

The present invention seeks to address these problems.

Accordingly there is provided a sealing apparatus for tamper-evidently closing an opening in a sealable product. The apparatus comprises a locking housing mountable adjacent the opening including an entrance passage leading to a stall, a fastener for closing the opening with a fastener head adapted to pass through the entrance passage into the stall, an actuator tab attached to and movable about the fastener head to, with the fastener head received into the stall, engage with and close the entrance passage behind the fastener head, and a seal for tamper-evidently securing the actuator tab in position in the entrance passage.

Preferably the seal comprises a first portion frangibly connected with a second portion, the second portion engageable with corresponding features of the actuator tab and entrance passage.

The first portion is preferably planar, with the second portion comprising at least one leg extending orthogonally from the first portion, wherein each at least one leg preferably has at least one foot distal the first portion.

Preferably the at least one leg includes at least one pair of legs, each leg resiliently deformable towards and away from the other member of the pair.

Preferably each leg of the pair of legs is adapted to resiliently deflect towards the respective other leg of the pair of legs to reduce the distance between respective feet to assist with insertion into an opening of the locking housing, and to resume a rest position when insertion is complete with the feet latchably engaged with corresponding respective shoulders within the locking housing.

Preferably the first portion is a T-shape, with a stem adapted to fit into at least part of the entrance passage and arms adapted to fit into a portion of the cavity transverse the entrance passage.

Preferably the second portion comprises two pairs of legs, a first pair positioned adjacent a first arm end remote the stem and a second pair positioned adjacent a second arm end, remote the first arm end.

Preferably the seal further comprises at least one feature for registration with the tab, wherein the at least one feature preferably includes horns for engagement with a projection on the tab.

Preferably the locking housing includes engagement means to engage with the second seal portion, wherein the engagement means preferably comprises openings to receive the at least one leg, and wherein the openings preferably extend through a first, top portion of the housing into a chamber in a second, base portion (14) of the housing.

Preferably the locking housing further comprises at least one evacuation means to evacuate the at least one leg upon the fracture thereof.

Preferably the tab comprises a planar cross-shaped body including a tab stem and tab arms, and further comprises a projection on the tab stem for engagement with a feature on the seal.

Preferably the tab further comprising a raised shroud on the tab stem for engagement with the fastener, wherein the fastener is preferably a zip, and wherein the tab further comprises openings at either end of the tab arms, adapted to receive a seal leg.

There is also provided a seal for use with the sealable apparatus described above.

There is also provided a sealable product including a sealing device as described above, wherein the sealable product may be a bag, pouch or envelope.

Figure 1A:
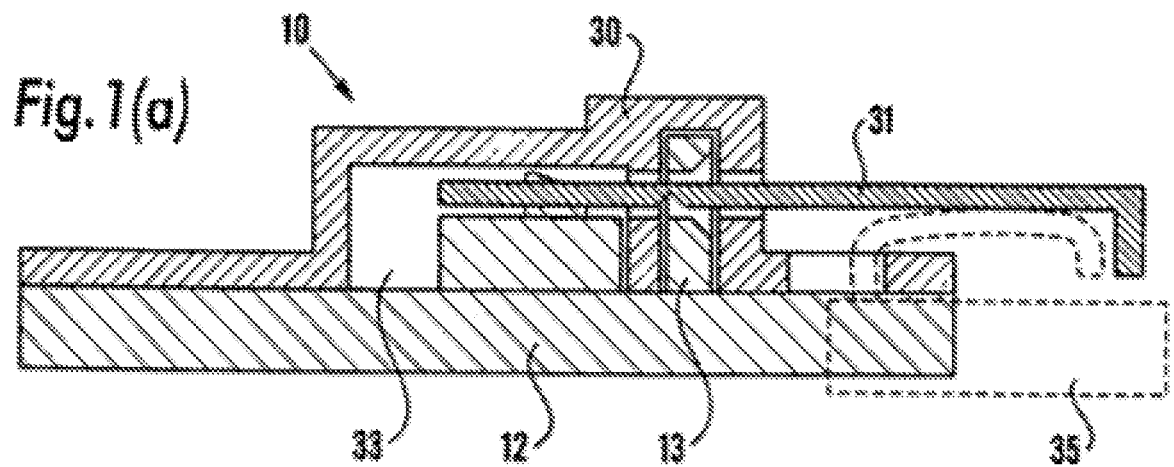
Figure 2A:
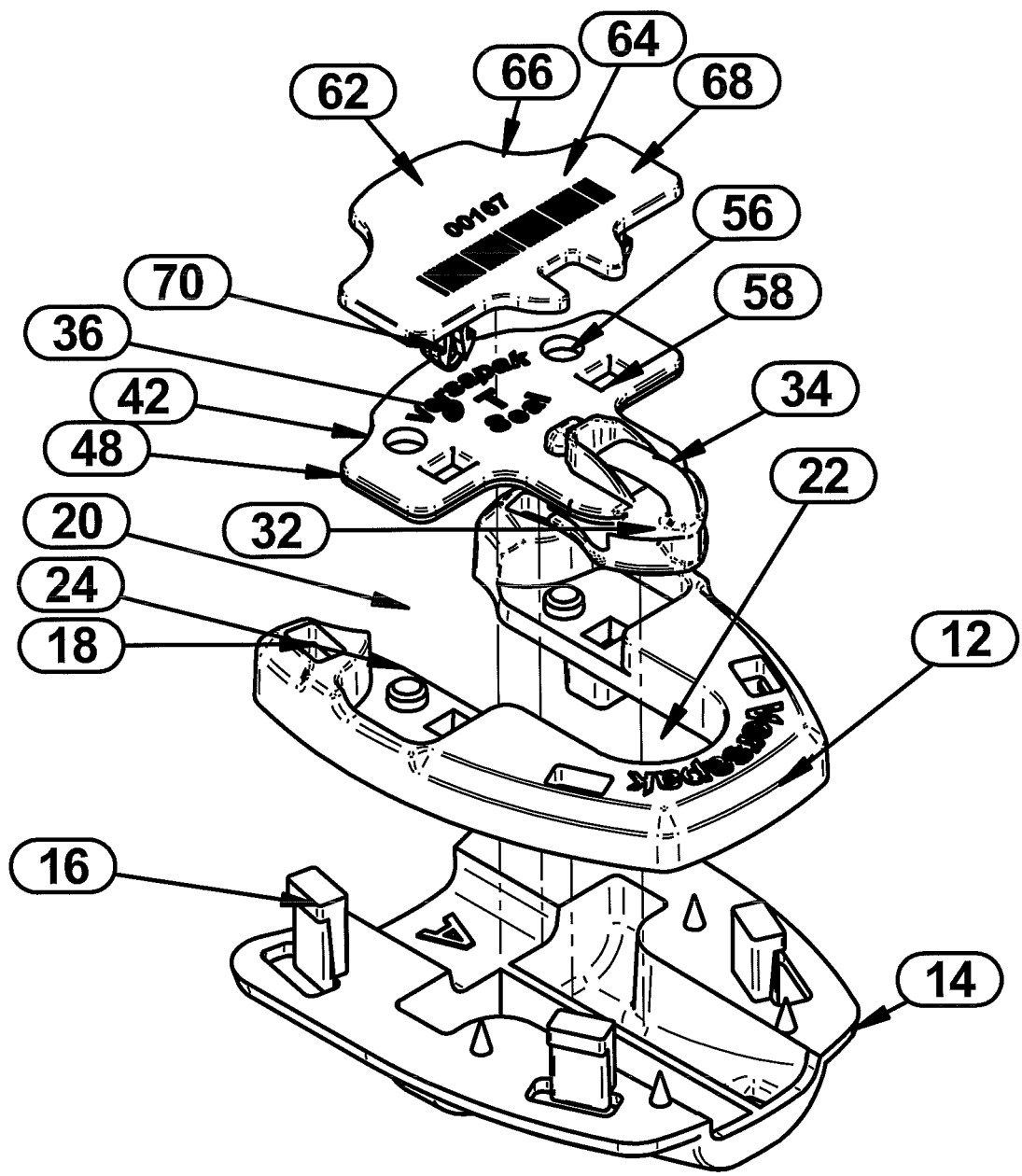
Figure 2:
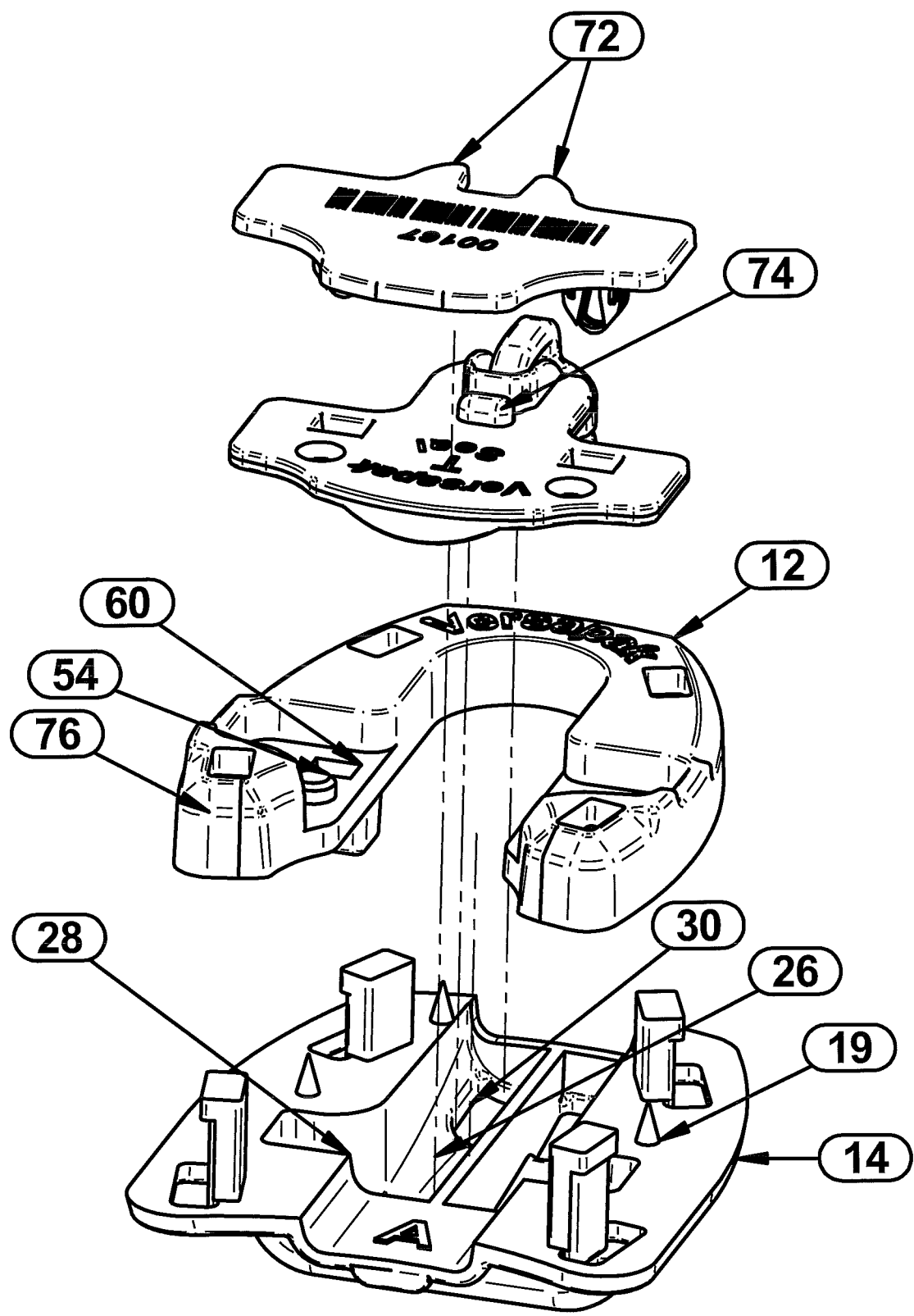
Figure 3:
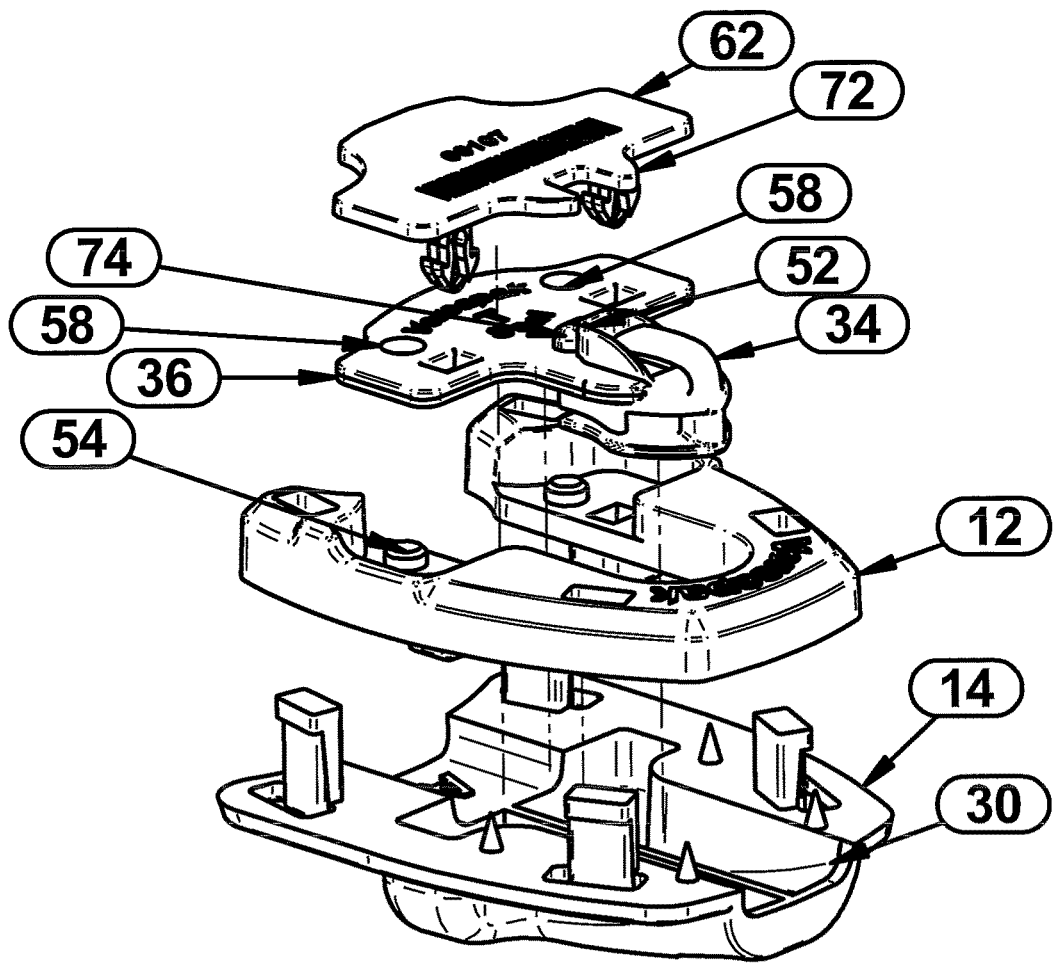
Figure 5:
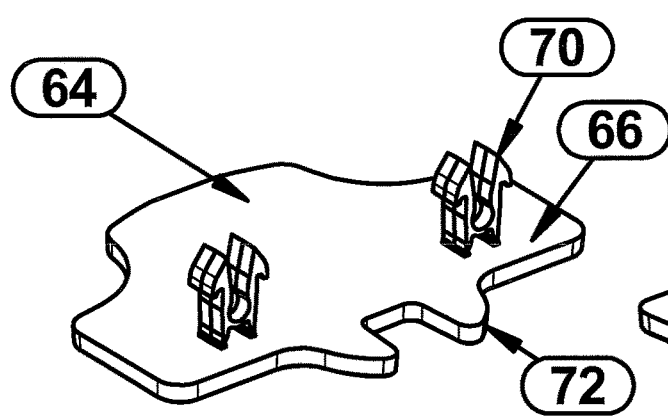
Figure 5:
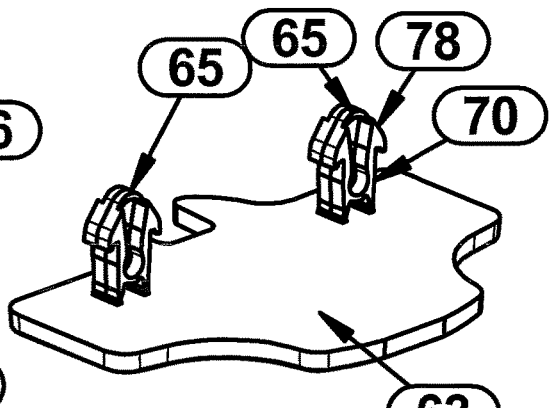
Figure 6:
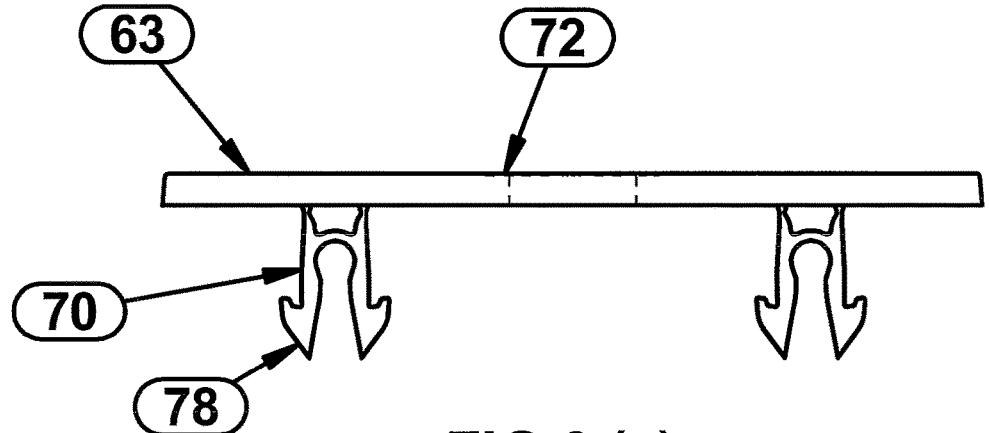
Figure 6:
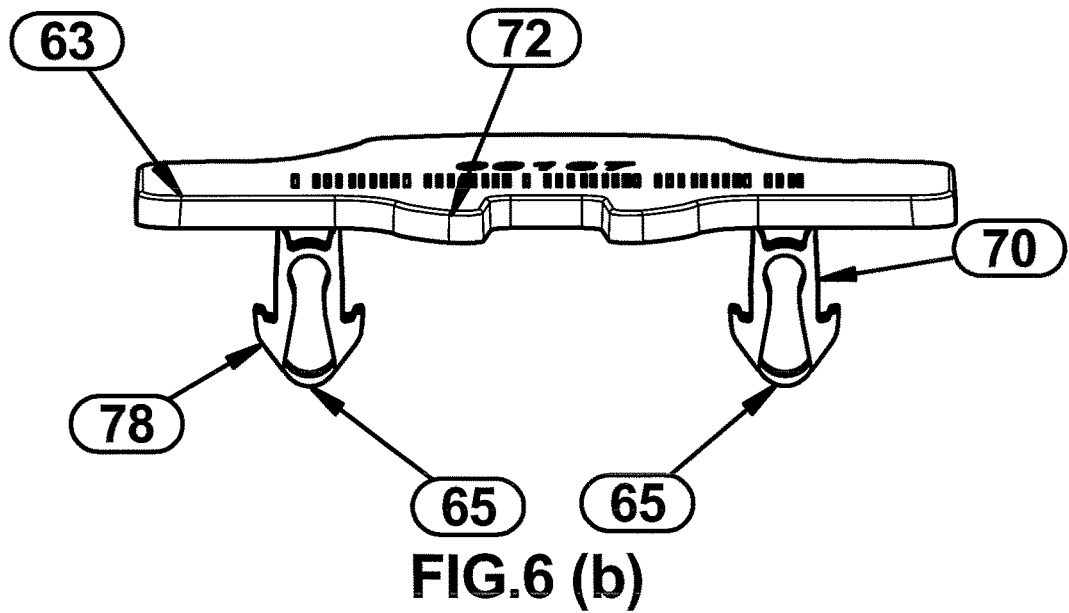
Figure 7:
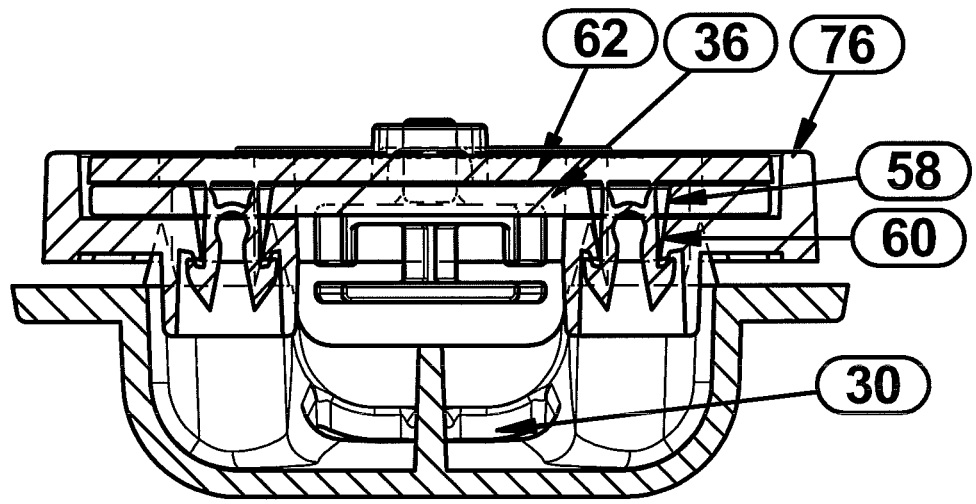
Figure 7:
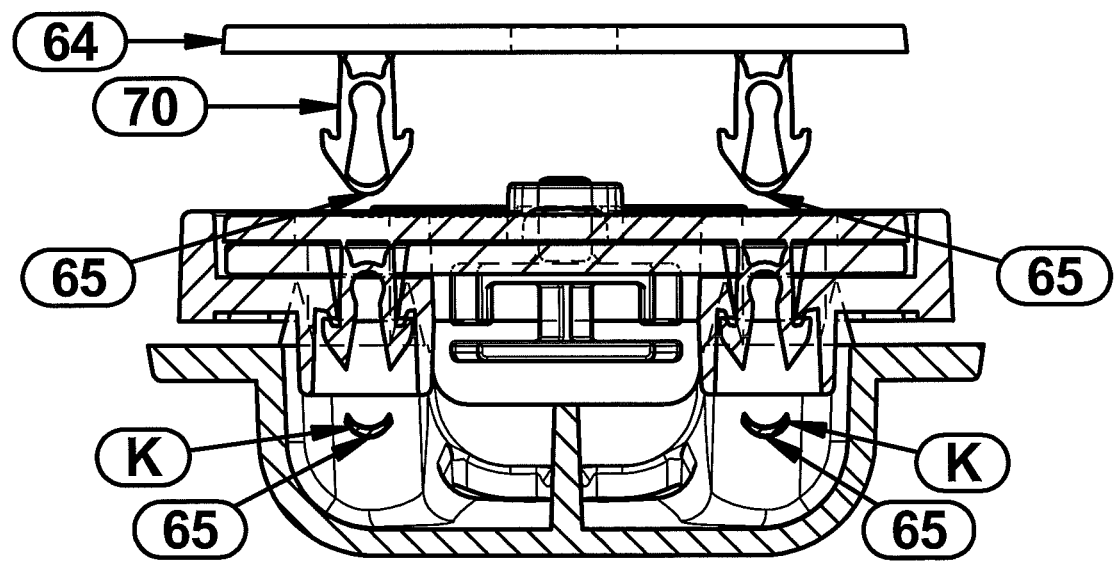
Figure 7:
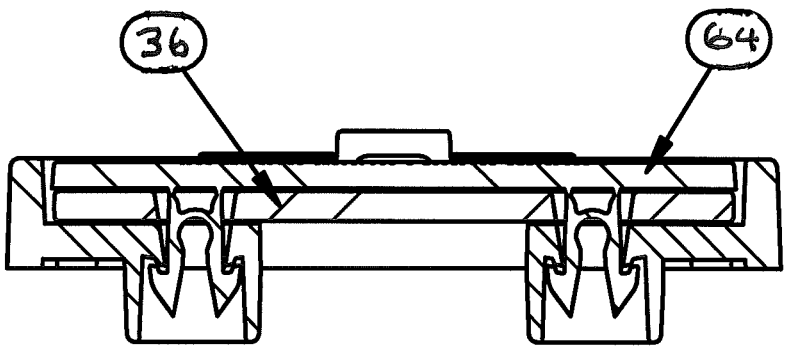
Figure 7:
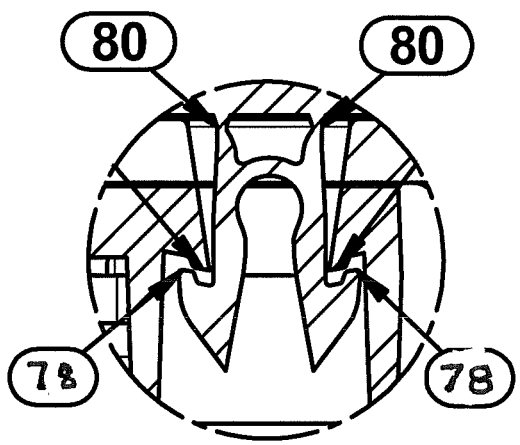
Figure 7:
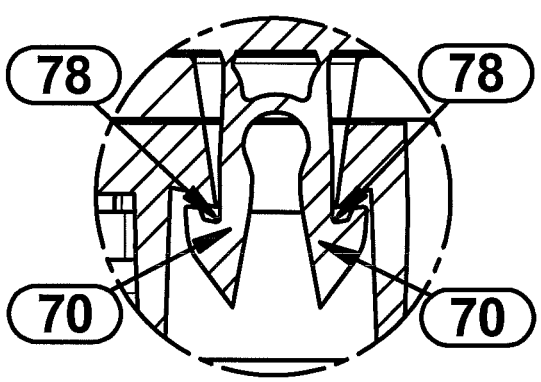
Figure 8:
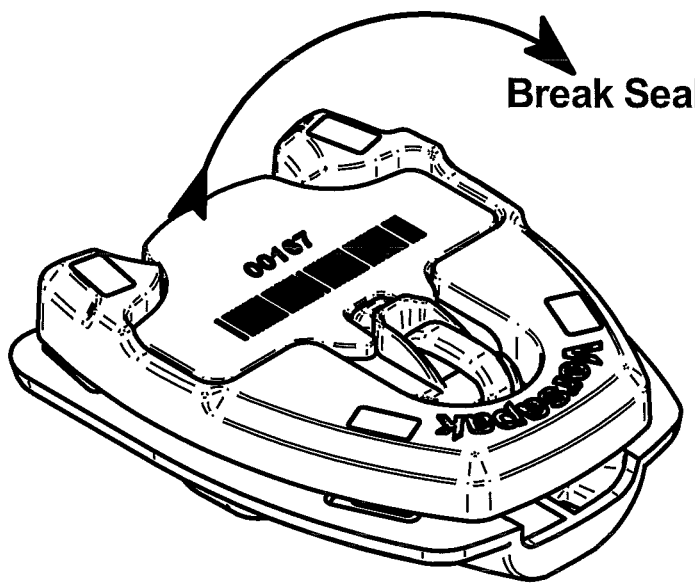
Figure 9:
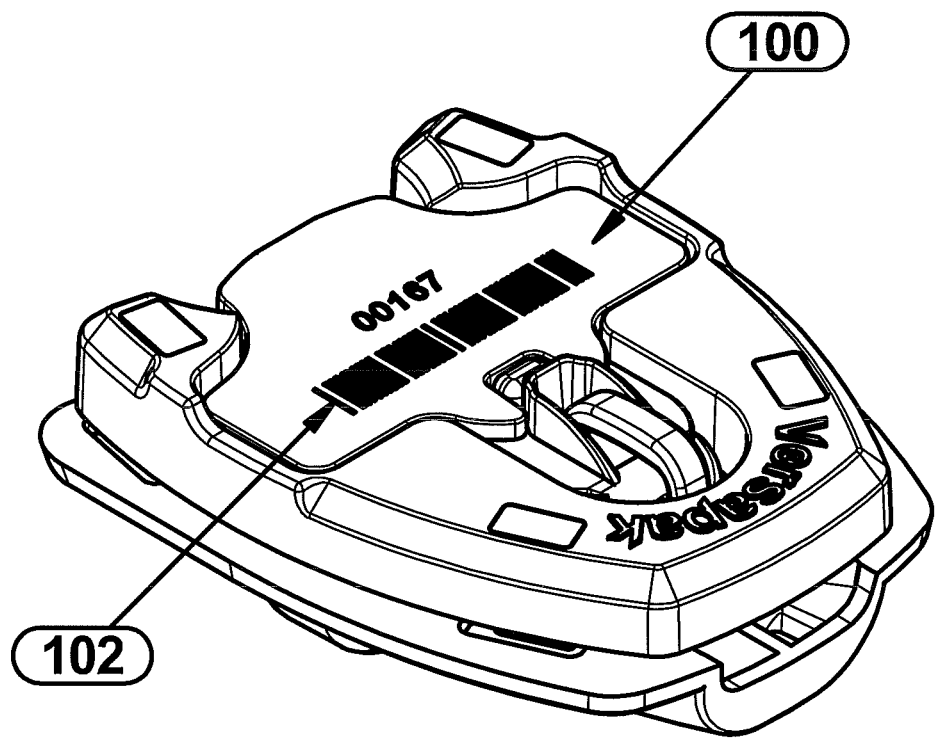
Figure 10:
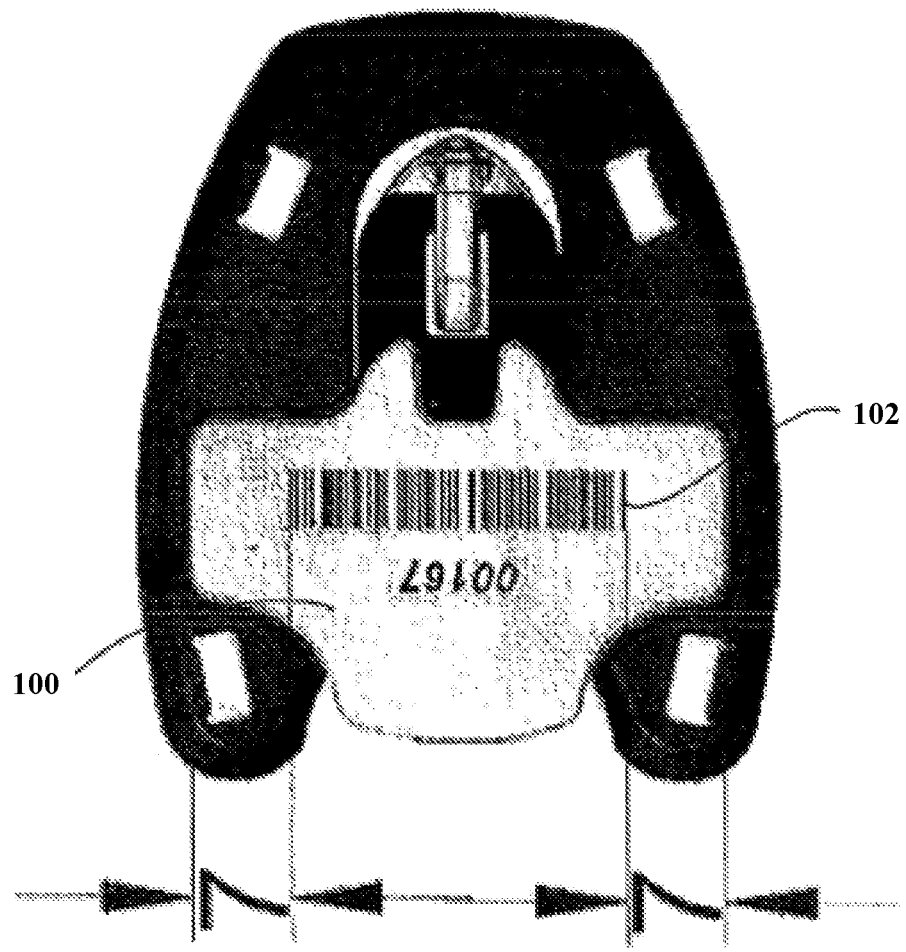

Preferred embodiments of the present invention will now be described by way of example only and with reference to the accompanying drawings in which:

FIGS. 1(a) and (b) show prior art sealing devices,

FIGS. 2(a) and (b) show exploded views of a locking housing, tab and seal of a first embodiment of the present invention, with a fastener portion engaged therewith, from a first and second orientation respectively, FIG. 3 provides a further view of the arrangement of FIG. 2(a), FIG. 4 shows a top-down view of the arrangement of FIGS. 2(a) and (b), FIG. 5(a) shows a perspective view of the seal of FIG. 2 in accordance with a first embodiment of the invention, FIG. 5(b) shows a perspective view of a seal in accordance with a second embodiment of the invention, FIGS. 6(a) and (b) show a sectional view of the seals of FIGS. 5(a) and (b) respectively, FIG. 7(a) shows a cross sectional view of FIG. 4, from A-A, FIG. 7(b) shows a cross sectional view of FIG. 4 from A-A, with a seal in accordance with a second embodiment, FIG. 7 (c), (d) and (e) show details of FIG. 7(a), FIG. 8 shows a perspective view of the sealing device with all elements engaged together, FIG. 9 shows a perspective view of a seal in place on a locking housing in accordance with a further embodiment, and FIG. 10 shows a perspective view of the seal of FIG. 9.

Figure 1B:
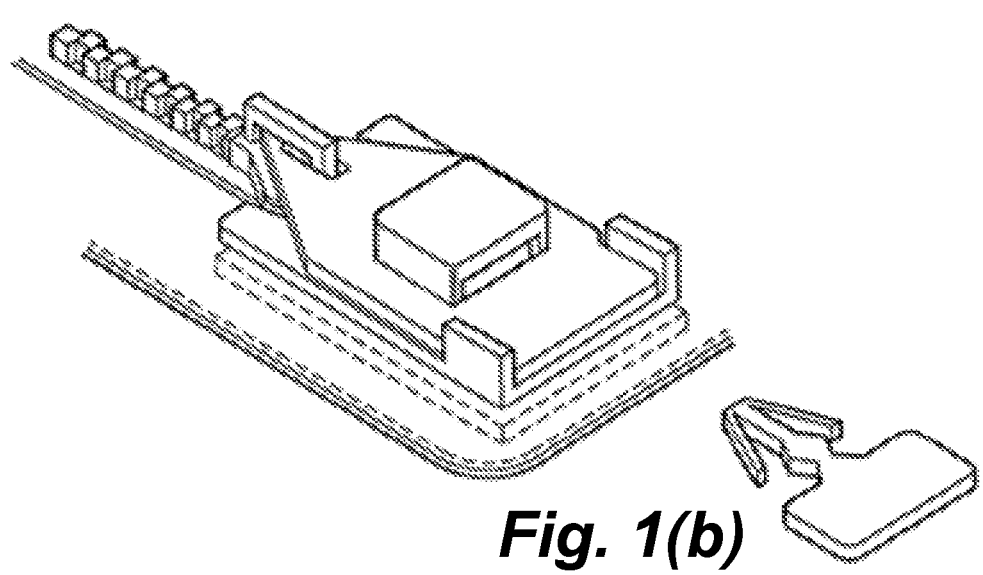

FIGS. 1(a) and (b) show respective prior art sealing devices as discussed above in relation to GB2420743 (present FIG. 1(a)) and GB1424680 (present FIG. 1(b)).

FIGS. 2(a) and (b) show perspective exploded views of a sealing device 10 from respective first and second directions, in accordance with the present invention, including a top 12 and a base 14 portion of a locking housing, the base portion including pillars 16 for engagement with slots 18 in the top portion for extending through the material of the mailing pouch, bag or other carrier for securely transporting matter. The base portion further includes projections 19 in the base portion adapted for engagement with for example the material of the carrier to engage the base of the housing securely to thereto. Of course, while the pillars and projections are placed in the base portion with corresponding features in the top portion, the pillars and projections may be placed on the top portion with the corresponding features on the base portion, or any variation thereof. These features are conventional and will not be discussed further.

As can be seen in FIGS. 2(a) and (b), top portion 12 of the locking housing further includes an entrance passage 20 leading to a stall 22, the entrance passage having side cavities 24 extending laterally therefrom. Base portion 14 includes a channel 26 including a chamber 28 and an exit passage 30, the chamber extending laterally across an end of channel 26. With the top and base portion of the locking housing engaged together, cavities 24 overlie chamber 28.

FIG. 2(a) further shows a portion of a fastener, specifically a zipper head 32, although other fasteners are contemplated and fall within the scope of the present invention, positioned in stall 22. The zipper head 32 includes a zip crown 34 which is engaged with a tab 36. Tab 36 is cross-shaped, with a first bar 38 having a first 40 and a second 42 end, and a second bar 44 with a first 46 and second 48 end. Tab 36 engages with the zip crown 34 at the first end 40 of the first bar 38, in a manner such that the tab may move about the zip crown, for example it may rotate from a position with the tab in front of the zip head and lying substantially in the plane of the zip head to a position with the tab behind the zip head, lying substantially in the plane of the zip head, as shown in FIGS. 2(a) and (b).

The crown 34 of the zip head passes through an opening 50 in the tab 36, the opening contemplated to be positioned adjacent first end 40 of first bar 38, The opening is surrounded on three sides by a shroud 52, which protects, and prevents access to, the opening 50 and zip crown 34, and any internal arrangement of the locking housing. The shroud may interfere with the positioning of the tab in front of the zip head, for example it may prevent the tab lying flat in the plane of the zip head, but this is not material.

With the zip head 32 positioned within the stall 22, the tab may be rotated or otherwise moved about the zip crown to lie behind the zip head, in the direction of and overlying the entrance passage, with in particular first bar 38 overlying the entrance passage 20 of the top portion 12 of the locking housing. In this position, second bar 44 overlies cavities 24, for example the second bar 44, from the first end 46 to the second end 48 is positioned over cavities 24, such that with the tab moved into position behind the zip head the tab is positioned to be, and is suitable to be, received into entrance passage 20 and cavities 24.

Cavities 24 include features which are engageable with corresponding respective features on first 46 and second 48 ends of the second bar 44 of tab 36. Such features include for example a finger 54 extending away from the base of each cavity 24, corresponding to respective slots 56 positioned at first 46 and second 48 ends of said second bar 44 of the tab 36, said respective fingers and slots arranged to engage with each other to securely anchor the tab in the cavity. Alternatively fingers 54 may be positioned at first and second ends of the second bar of the tab, with corresponding openings in the cavity base. Tab 34 further includes, at first and second ends of second bar 44, openings 58 which, with the tab received into the entrance passage and cavities, align with corresponding openings 60 in the base of the cavities, providing a passage from the top of the tab when in position in the top portion of the locking housing through to the chamber 28 in the base of the locking housing.

Thus the tab may be held securely in position on the top portion of the locking housing, preventing or substantially preventing access to the entrance passage 20 and cavities 24 of the top portion 12, and further preventing exit of the zipper head 32 out of the stall 22 and providing for secure retention of the zipper head in the stall.

FIGS. 2(a) and (b) also show a seal 62, adapted to co-operate with the locking housing and tab, to secure the closure is a tamper-evident closure. For example, the seal 62 has a T-shaped planar body 64, with a stem 66 shaped to overlie at least a portion of first bar 38 of tab 36 and sit within the entrance passage 20 of the locking housing, and arms 68 shaped to overlie the second bar 44 of the tab and sit within cavities 24.

Seal 62 includes legs 70, positioned at remote ends of arms 68 and extending orthogonal the plane of the seal such that, with the seal overlying tab 36, and the tab in position in the locking housing, legs 70 extend into openings 58 in tab 36 and corresponding openings 60 in cavities 24.

It is contemplated that the seal includes at least one leg, positioned at least at one end of one arm 68, however in a first embodiment the seal includes two pairs of legs, one pair at a first end of arms 66, and a second at a second end of arms 68 remote the first end. In a second embodiment a first member of each pair is attached to the corresponding second member of the pair by a 'bridge 65', extending between remote ends 68. With the seal positioned above the housing and tab, and fingers 54 aligned with slots 56, legs 70 are aligned with openings 58 in tab 36 and openings 60 in cavities 24. Urging the seal towards the housing provides for legs 68 to enter the openings 58, 60 so that, with the seal securely engaged, the seal will lie within the entrance passage 20 and cavities 24. The bridge provides additional strength to the seal, making it less likely that the legs will snap off at the frangible part and providing for the legs to remain attached to the body on insertion into openings 58 and 60.

The seal includes a further feature 72 which is adapted to engage with a corresponding feature 74 on tab 36. The further feature 72 comprises a pair of horns which, with the seal engaged with the tab and housing, are positioned either side of a post 74 on an upper side of the tab, facing away from the locking housing. This may be seen more clearly in FIGS. 4 and 8.

FIGS. 2(a) and (b) show an additional feature, ridges 76, positioned on the top part of the housing, either side of entrance passage 20. With the tab and seal positioned in entrance passage 20 and cavities 24, ridges 76 extend proud of the top surface of the locking housing, and also of the tab and seal, providing a further barrier to access to the sealing device.

FIG. 3 provides a further view of the arrangement of FIGS. 2(a) and (b).

FIG. 4 shows a top-down view of the arrangement of FIGS. 2(a) and (b) and FIG. 3. FIG. 4 clearly shows pillars 16 of bottom part 14 of the locking housing engaged with slots 18 in top part 12 of the locking housing, zipper head 32 in position in stall 22, with tab 36 positioned behind the zipper head overlying entrance passage 20. Shroud 52 surrounds zipper crown 34, and horns 72 of seal 62 engage post 74 on an upper surface of tab 36. The T-shaped planar body 64 of seal 62 overlies a portion of cross-shaped tab 36, both of which are positioned in entrance passage 20 and cavities 24 of top portion 12 of the housing.

FIGS. 5(a) and (b) show a perspective view of the base of the seal of FIGS. 2 and 3, showing horns 70 and a pair of legs 68 at respective ends of arms 68, in accordance with the first and second embodiment, respectively. FIG. 5(b) shows the legs of the second embodiment attached together, at ends distal seal body 64, by bridge 65. FIG. 6(a) shows a sectional view of seal 62 of FIG. 5(a), showing the planar body 63 with horns 72, and a pair of legs 70, at remote ends of arms 66. The pairs of legs are conventional, comprising two legs resiliently deformable towards each other, and frangibly attached to planar body 63. The legs 70 include conventional feet 78, at ends 67 of each leg remote seal body 64, each foot extending in a direction away from the opposing leg of the pair. When inserting the legs into openings 58 in the tab and openings 60 in the cavities, the legs flex towards each other to reduce the distance between opposing feet and allow the legs to enter into the openings. Once the legs have passed through the openings, they tend to return to their original, rest positions and conventionally act to retain the legs within the openings.

In particular the openings 58 and 60 have inwardly sloping sides, so that a wider opening is provided for the legs when the legs are initially introduced into the opening, the opening narrowing such that the exit opening is narrower. This may be seen more clearly in FIG. 7(a). The legs are adapted to extend beyond the openings 60 in the cavities at which point they enter a space in which the legs may relax to a rest position with feet 78 latchably engaged with shoulders either side of the exit. Thus the legs secure the seal in position in the housing. In addition, the legs secure the tab in position in the housing, as the tab is sandwiched between the seal and the housing.

FIG. 6(b) shows a sectional view of seal 62 of FIG. 5(b), showing the planar body 63 with horns 72, and a pair of legs 70, at remote ends of arms 66. The pairs of legs are similar to the legs of FIG. 5(a), but additionally include a bridge, 65, connecting feet ends 67 of legs 70 together. When inserting the legs into openings 58 in tab 34, the legs flex together to reduce the distance between opposing feet and allow the legs to enter into opening 58. Opening 58 is slightly narrower than the feet ends of the legs, but sufficiently wide that the legs may flex together, despite the presence of bridge 65, to enter the opening 58. Opening 60 in the cavity 24 is narrower than opening 58 so the deflection of the legs to gain entry is more significant than the flexing needed to enter opening 58, and the flexing needed to enter opening 60 is sufficient to break bridge 65. Once the legs have passed through both openings, they tend to return to their original, rest positions and conventionally act to retain the legs within the openings, albeit without bridges 65 connecting feet ends of the legs together. Bridges 65 maintain the integrity of the seal legs 70 on initial entry to openings 58 in tab 34, and provide for a more robust seal, but snap when further the deflection is needed to enter openings 60 in cavities 24.

On gently urging the seal off the housing, feet 78 are urged against the shoulders either side of the exit, which thereby results in resistance to disengagement of the seal with the housing. Applying further force will result in the frangible connection of the legs 70 with the seal body 64 breaking and the seal detaching from the housing, allowing tab 36 to be removed from the housing and the zip moved out of the stall through the entrance passage to permit access to the interior of the bag.

FIG. 7(a) shows a cross sectional view of the arrangement of FIG. 4, from lines A-A. Ridges 76 are shown extending above the plane of the top portion of the housing. In addition, FIG. 7(a) shows tab 36 and seal 62 in position in the housing, secured in cavities 24 and entrance passage 20. The sloped sides of openings 58 and 60 are shown, with legs 70 extended therethrough, having returned to their rest position. Furthermore feet 78 are shown extending either side of the exit of opening 60 such that some play is provided for before the feet latchably engage with shoulders on either side of the exit of openings 60. FIG. 7(a) also shows that the tab and seal are positioned above chamber 28 in base portion 14, such that if additional force is exerted on the seal and the legs break at the frangible connection, the broken legs fall into channel 26, falling first into chamber 28, and passing out of the locking housing via exit passage 30. In addition, on breaking, bridge 65 may also fall into channel 26, falling first into chamber 28, to pass out of the locking housing via exit passage 30.

FIG. 7(b) shows a seal in accordance with the second embodiment of the invention, poised above a cross sectional view of the arrangement of FIG. 4, from lines A-A. The cross sectional view shows the seal in accordance with the second embodiment in position in the housing, with the bridge 65 snapped off and falling into the chamber 28 to pass through the passage 26 and out the exit 30. The top part of the housing 12 is engaged with the bottom part of the housing 14, with the tab present below the seal 64. A portion of the zipper head 32 is also shown in position in the housing with the tab 36.

FIG. 7(c) shows a detail of the engagement of seal legs 70 with the openings 58 and 60, showing the play available to the feet 78 to accommodate natural movement of the seal during transit. Additional force, for example force exerted to remove the seal from the housing, causes feet 78 to engage with shoulders either side of opening 60 exit. FIG. 7(d)

shows a further view of FIG. 7(c) with the frangible attachment 80 of legs 70 to the planar seal body 64.

FIG. 7(e) shows a further sectional view of the arrangement of FIG. 7(a).

FIG. 8 shows the seal in a secured orientation, with the base and top portion of the seal housing engaged together via pillars 16 and slots 18, with zipper head 32 positioned within stall 22, tab 36 attached to zipper crown 34 and positioned behind zipper head 32 within entrance passage 20 and cavities 24, secured therein by engagement of fingers 54 with slots 56, and further secured by engagement of seal 62 in the housing. Seal 62 is positioned above tab 36 within entrance passage 20 and cavities 24, with horns 72 surrounding post 74, and legs (not shown) engaged with openings 58 in tab 36 and 60 in cavities 24. The seal fits securely within the entrance passage 20 and cavities 24, providing a smooth surface for the locking housing. With zipper head 32 in stall 22 zipper crown 34 remains below, or substantially below, the upper surface of top part 12 of the locking housing. A portion of stem 66 may extend beyond the locking housing providing a convenient means for a user to engage with the stem to urge the stem away from the locking housing to open the fastener.

FIGS. 9 and 10 show a further embodiment which provides for a seal with larger arms, and also shows a corresponding seal with larger arms than the other embodiments. This embodiment covers an arrangement in which cavities 24 extend more deeply into the rim of the top portion of the locking housing, and this may also include chambers which also extend correspondingly deeply into the rim of the base portion of the locking housing; it also covers an arrangement in which the cavities of the upper portion of the locking housing and the chambers in the base portion of the locking housing are the same size as in the other embodiments, but the top and base portions of the locking housing are adapted to accommodate a seal with larger arms.

A seal in accordance with this further embodiment is contemplated to still be broadly T-shaped, but the arms of the seal are more substantial compared with the stem.

An advantage of having a seal in accordance with this further embodiment is provision of a platform or region upon which information may be located on the seal which may easily be read, in particular it may easily be read without dismantling or in any way interfering with the seal, locking housing or item transported. FIGS. 9 and 10 show a bar code provided to the seal, in an arrangement and orientation in which the bar code may easily be read at any time. The bar code may extend across the arms of the seal, and further information may be provided on the seal, as shown by the numbers printed below the bar code. Alternatively the bar code or information may be provided along the stem of the seal. It is noted that the bar code shown is exemplary only, any information may be provided on the visible surface of the seal, including any type of bar code or identifier. The particular bar code shown, and in addition, the particular number printed underneath the bar code, is not material or limiting and any information, bar code, or other subject matter may be provided thereon.

FIG. 10 indicates a size for the portions of the locking housing either side of the passage, for example a number 7 is set out to indicate for example that these portions may be of the order of 7 mm in size, however this is not intended to be limiting: other sizes are contemplated and fall within the scope of the application.

The features described provide for a sealing device with a multitude of means to discourage and prevent access to the fastener, in particular discouraging or preventing tampering with the secure transport of goods. It would be obvious on receipt of the package sealed by the sealing device of the present invention if tampering has occurred during transit.

In use, transport means such as an envelope, pouch or bag including a sealing device in accordance with the present invention may be used to transport goods by placing the sealing device in an open orientation, placing goods inside, and then placing the sealing device in a closed orientation. In particular for example a zipper head 32 may be moved to a closed orientation to close the transport means such that the zipper head 32 moves into an entrance passage 20 in a top part 12 of a locking housing, passing ridges 76 either side of entrance passage 20 then passing cavities 24 also positioned either side of entrance passage 20 after ridges 76 and before stall 22. Therefrom zipper head 32 moves into a stall 22 at the end of the entrance passage remote the entrance. When in position within stall 22, an upper surface of the zipper head, including zipper crown 34, lies level with or below an upper surface of the top part of the locking housing 12. T-shaped tab 36 attached to zipper crown 34 may then be moved to a position overlying entrance passage 20 and cavities 24, and may rest within the passage and cavities. With the tab positioned within the passage and cavities, slots 56 in tab 36 engage with fingers 54 in cavities 24 to secure the tab in place, and openings 58 at first 40 and second 42 ends of first bar 38 of tab 36 overlie openings 60 in cavities 24.

In this position, shroud 52 is conveniently positioned around zipper crown 34, protecting the zipper head from any attempt to access the internal arrangement of the locking housing. It is contemplated that a top surface of shroud 52 also lies parallel with or below an upper surface of the top portion of the locking housing 12. The zipper, including the zipper head and crown are thereby securely nestled within stall 22, and access to the same is rendered difficult if not impossible.

Seal 62 may then be positioned over tab 36, with legs 70 positioned over openings 58 and 60, and urged towards tab 36 so that feet 78 of legs 70 enter the mouth of openings 58. The sides of openings 58 are wider at the point of entry, and slope to narrow at the exit, so that legs entering the mouth of the openings are urged towards, and flex towards each other to allow entry of the legs through opening 58. The legs proceed through openings 58 and then pass into openings 60 in cavities 24, continuing to flex towards each other until seal 62 rests on tab 36 within the entrance passage 20 and cavities 24. Bridges, 65, if present on the seal, snap when seal is urged into openings 60 to allow the legs to flex towards each other to an extent sufficient to allow passage of legs 70 through openings 60. Snapped bridges 65 then fall into chamber 28 of channel 26 of the bottom part of the locking housing to pass out along the channel and of the locking housing through exit passage 30.

When the legs are fully inserted, the legs emerge from opening 60 in cavities 24 and flex back to their rest position, with feet 78 extending beyond the exit of opening 60. With feet 78 positioned beyond the exit, and in a rest position, any movement of the seal away from the surface of the tab will urge the feet towards the exit whereupon they will abut the outer edge of the opening, preventing further movement of the seal upwardly and away from the tab. The feet extend beyond the opening in a manner that allows some free play of the seal so that minor or inconsequential movement of the seal during transit will not exert undue force on the seal sufficient to break the frangible attachment of the legs to the seal and therefore cause the lock to open.

With the seal in position in the entrance passage and cavities, and the legs inserted into the openings, horns 72 engage with a post 74 positioned on a top surface of tab 36, so that lateral movement of the seal is restricted and the tab and seal are securely positioned within the entrance passage and cavities. Post 74 extends upwardly and away from a top surface of the tab when the tab is positioned on the locking housing such that a top surface of the post lies parallel with or below a top surface of the top part of the locking housing.

While transporting the for example envelope, pouch or bag tamper evidently sealed by the mechanism of the present invention, it may be desired to review the particular envelope, pouch or bag, for example to monitor the progress of the transport, to track it, or to identify the particular envelope, pouch or bag that is to hand at any given time. In accordance with the further embodiment this may be achieved by simply reviewing the information provided to the outer, visible surface of the seal, for example by viewing the said surface, or by scanning it if the seal is provided with a bar code. This is a very useful feature of the present arrangement.

When it is desired to gain entry into the interior of the envelope, pouch or bag, sufficient force is exerted upon the seal, for example on that portion of the seal stem that may extend beyond the entrance passage, in a direction away from the tab, to cause the frangible connection of the legs to the seal to break, causing the seal to separate from the locking housing. The broken legs then fall into chamber 28 of channel 26 of the bottom part of the locking housing to pass along the channel and out of the locking housing through exit passage 30.

With the seal removed from the locking housing tab 36 may then be lifted out of the entrance passage and cavities to move freely around zipper crown 34, to assist with movement of the zipper away from stall 22 along entrance passage 20 and away from the sealing device into an open orientation where access to the contents of the envelope is possible.

If access to the interior of the envelope, pouch, bag or other transport means is the intention of those using, and responsible for, the envelope and contents, then secure transport of the contents has successfully completed. If access to the interior of the was illicit, then it will be clear to those receiving the envelope that the contents have been accessed and the transport means tampered with.

All aspects of the sealing device have been designed to protect the integrity of the sealing housing and the contents of the envelope, pouch or bag and to clearly indicate when the sealing device has been tampered with and the envelope, pouch or bag contents potentially accessed illicitly. For example, the zipper head and zipper crown are contained within a stall within the locking housing, and do not extend above a top surface of a top part of the locking housing, meaning that no access to any part of the mechanisms is easily possible, as all parts of the mechanism lie within the locking housing and within a stall with walls on all sides. In addition, the zipper head is secured within the stall as access to the stall is only by means of the entrance passage 20, which is then sealed behind the zipper head by tab 36, also positioned in entrance passage 20 and cavities 24 in the top portion 12 of the locking housing. Tab 36 is also securely held in the locking housing, as, being positioned within the entrance passage 20 and cavities 24, no access to the tab is possible from the sides, and access to the tab from the front is discouraged by the position of the zipper head, zipper crown, and shroud 52. Seal 62, positioned above tab 36 and also within entrance passage 20 and cavities 24, with a top surface of the seal parallel with a top surface of the top part of the locking housing also protects the tab from any access from the sides or back. The seal is secured in position with legs 70 entered into and secured with openings 58 and 60, and also with horns 72 engaged with post 74 on a top surface of tab 36, all, again, level with, or below a top surface of the top part of the locking housing.

The apparatus described includes a seal for a sealable product which includes a fastener and a sealing device for securing the fastener, in which the sealing device comprises a locking housing having an entrance passage into a stall for receiving the fastener, a tab connected to the fastener and engageable with the locking housing to close the entrance passage with the fastener received into the stall, wherein said seal comprises a first portion frangibly connected with a second portion, the second portion engageable with a corresponding feature of the sealing device.

The second portion may comprise at least one leg extending orthogonally from the first portion, and each at least one leg may have at least one foot distal the first portion. The at least one leg may further include at least one pair of legs, each leg resiliently deformable towards and away from the other member of the pair, wherein each leg of the pair of legs may be adapted to resiliently deflect towards the respective other leg of the pair of legs to reduce the distance between respective feet to assist with insertion into an opening of the locking housing, and to resume a rest position when insertion is complete with the feet latchably engaged with corresponding respective shoulders within the locking housing.

The first portion of the seal may be planar. The seal may be further adapted to be received within a corresponding cavity in the locking housing. The first seal portion may be a T-shape, with a stem adapted to fit into at least part of the entrance passage and arms adapted to fit into a portion of the cavity transverse the entrance passage.

The second portion may comprise two pairs of legs, a first pair positioned adjacent a first arm end remote the stem and a second pair positioned adjacent a second arm end, remote the first arm end, and the seal may further comprise at least one feature for registration with the tab, which may be horns for engagement with a projection on the tab, such as a pair of horns.

In addition the apparatus described may include a sealing device for a sealable product having a fastener in which the sealing device comprises a locking housing having an entrance passage into a stall for receiving said fastener, a tab connected to the fastener and engageable with the locking housing to close the entrance passage with the fastener received into the stall, wherein the sealing device is usable with a seal as described above.

The apparatus may further comprises engagement means to engage with the second seal portion, wherein the engagement means may comprise openings to receive the at least one leg which may extend through a first, top portion of the housing into a chamber in a second, base portion of the housing. The openings may have tapered sides, being narrower adjacent the chamber.

The apparatus may further comprise at least one evacuation means to evacuate the at least one leg upon the fracture thereof, and the openings in the base portion may feed into a chute for evacuation of the at least one leg upon the fracture thereof.

The apparatus may further include a cavity transverse the entrance passage, adapted to receive a portion of the tab, and may further include a cavity transverse the entrance passage, adapted to receive the first seal portion.

The apparatus may further include ridges positioned either side of the entrance passage, wherein the ridges may be positioned anterior the transverse cavity.

The apparatus described includes pillars engageable with holes in the tab, and holes engageable with pillars in the tab.

In addition the apparatus may include a tab comprising a planar cross-shaped body including a tab stem and tab arms, and further comprising a projection on the tab stem for engagement with the horns discussed above, and may further comprise a raised shroud on the tab stem for engagement with the fastener.

The fastener may be a zip.

The raised shroud may comprise walls to surround three sides of a zip crown.

The tab may further comprise openings at either end of the tab arms, and each opening may be adapted to receive a seal leg, the opening are contemplated to be wider at a horn engaging projection side of the tab than at a side opposite the horn engaging projection side, with sloped walls.

The tab may further include means co-operative with means on the housing to position and secure the tab in place on the housing, wherein the means may include holes, adapted to receive pillars in the housing, and/or may include pillars adapted for insertion into holes in the housing. The tab means may be positioned on the tab arms.

In addition the apparatus describes a sealable product having a sealing device as discussed above.

In addition the apparatus describes a sealable product such as a bag, pouch or envelope.

The invention is not restricted to the details of the foregoing embodiments. For example, any conventional arrangement of seal legs is contemplated and falls within the scope of the present invention. In particular the legs may comprise a single leg, or the pairs of legs may have feet that point inwardly, with further conventional mechanisms to secure the legs, and therefore the seal, in place. In accordance with the second embodiment of the seal, bridge 65 may snap on entry into the first opening 58 in tab 36, or may not snap at all on entry into either opening. In addition, while the sealing device is directed to envelopes, pouches or bags, any other suitable carrying devices are contemplated to fall within the scope of the invention. While the embodiments are directed to a fastener such as a zipper, any other suitable fastener is contemplated to fall within the scope of the invention. The cavities and chambers described are not restricted to the shapes and orientations set out above, but may extend to any other suitable arrangement, in addition it is not contemplated that the tab be restricted to the shape disclosed, as any other suitable shape is contemplated to fall within the scope of the invention. It is further contemplated that the shroud may comprise an alternative suitable mechanism to protect the zipper crown, as may the fingers/openings for securing the tab to the cavity. In addition, while a pair of horns is disclosed, another suitable arrangement is contemplated to fall within the scope of the invention.

What is claimed is:

1. A sealing apparatus for tamper-evidently closing an opening in a sealable product, the apparatus comprising:
   a locking housing mountable adjacent said opening and including an entrance passage leading to a stall;
   a fastener for closing said opening, said fastener having:
      a fastener head adapted to pass through said entrance passage into said stall, and
      an actuator tab attached to and movable relative to said fastener head, the actuator tab being configured and arranged to engage with and close said entrance passage behind said fastener head such that said actuator tab is configured and arranged to seal said opening with a surface of the actuator tab whereby the actuator tab forms part of a first seal on the opening in response to said fastener head being received into said stall; and
   a second seal configured and arranged to tamper-evidently secure said actuator tab in position in said entrance passage, where said second seal is configured and arranged to cover said actuator tab.

2. The sealing apparatus as claimed in claim 1 wherein said second seal comprises a first portion frangibly connected with a second portion, said second portion engageable with corresponding features of said actuator tab and entrance passage.

3. A sealing apparatus for tamper-evidently closing an opening in a sealable product, the apparatus comprising:
   a locking housing mountable adjacent said opening and including an entrance passage leading to a stall;
   a fastener for closing said opening, said fastener having:
      a fastener head adapted to pass through said entrance passage into said stall, and
      an actuator tab attached to and movable relative to fastener head, the actuator tab being configured and arranged to engage with and close said entrance passage behind said fastener head and seal said opening in response to said fastener head being received into said stall; and
   a seal comprising a first portion frangibly connected with a second portion, said second portion engageable with corresponding features of said actuator tab and entrance passage, the seal being configured and arranged to tamper-evidently secure said actuator tab in position in said entrance passage, wherein said first portion is planar, and said second portion comprises at least one leg extending orthogonally from said first portion, and wherein each at least one leg has at least one foot distal said first portion.

4. The sealing apparatus as claimed in claim 3 wherein said at least one leg includes at least one pair of legs, each leg resiliently deformable towards and away from the other member of the pair.

5. The sealing apparatus as claimed in claim 4 wherein each leg of said pair of legs is adapted to resiliently deflect towards said respective other leg of said pair of legs to reduce the distance between respective feet to assist with insertion into an opening of said locking housing, and to resume a rest position when insertion is complete with said feet latchably engaged with corresponding respective shoulders within said locking housing.

6. A sealing apparatus for tamper-evidently closing an opening in a sealable product, the apparatus comprising:
   a locking housing mountable adjacent said opening and including an entrance passage leading to a stall;
   a fastener for closing said opening, said fastener having:
      a fastener head adapted to pass through said entrance passage into said stall, and
      an actuator tab attached to and movable relative to fastener head, the actuator tab being configured and arranged to engage with and close said entrance passage behind said fastener head and seal said opening with a surface of the actuator tab in response to said fastener head being received into said stall; and
   a seal including a first portion frangibly connected with a second portion, wherein said first portion is a T-shape, with a stem adapted to fit into at least part of said entrance passage and arms adapted to fit into a portion of said opening transverse said entrance passage, and wherein said second portion is engageable with corresponding features of said actuator tab and entrance passage, the seal being configured and arranged to tamper-evidently secure said actuator tab in position in said entrance passage.

7. The sealing apparatus as claimed in claim 6 wherein said second portion comprises two pairs of legs, a first pair positioned adjacent a first arm end remote the stem and a second pair positioned adjacent a second arm end, remote the first arm end.

8. The sealing apparatus as claimed in claim 1 wherein said second seal further comprises at least one feature for registration with said tab, wherein said at least one feature includes horns for engagement with a projection on said tab.

9. The sealing apparatus as claimed in claim 3 wherein said locking housing includes engagement means to engage with said second portion, wherein said engagement means comprises openings to receive said at least one leg, and wherein said openings extend through a first, top portion of said locking housing into a chamber in a second, base portion of said locking housing.

10. The sealing apparatus as claimed in claim 9, further comprising at least one evacuation means to evacuate said at least one leg upon the fracture thereof.

11. The sealing apparatus as claimed in claim 3 wherein said actuator tab comprises a planar cross-shaped body including a tab stem and tab arms, and further comprises a projection on said tab stem for engagement with a feature on said seal.

12. The sealing apparatus as claimed in claim 11, wherein said tab further includes a raised shroud on said tab stem, the raised shroud being configured to engage with said fastener, wherein said fastener is a zip, and wherein said tab further comprises openings at either end of said tab arms, adapted to receive a seal leg extending from the seal.

13. A seal for use with a sealable apparatus according to claim 3.

14. A sealable product including a sealing device as claimed in claim 3.

15. A sealable product as claimed in claim 14 wherein the sealable product comprises a bag, pouch or envelope.

16. The apparatus of claim 3, wherein the locking housing includes housing apertures extending through a top surface into an interior channel and through an exit passage to an outside of the housing;

the actuator tab includes tab apertures corresponding to respective housing apertures; and the seal includes a first portion frangibly connected with at least one second portion for tamper-evidently securing the actuator tab in position in the entrance passage, and the at least one second portion of the seal is extendable through at least one of the housing and tab apertures and is configured and arranged to, on breaking, pass out of the housing through said channel and exit passage.

* * * * *